(12) United States Patent
Kang et al.

(10) Patent No.: US 9,113,048 B2
(45) Date of Patent: Aug. 18, 2015

(54) METHOD AND DEVICE FOR INSPECTING SURFACE

(75) Inventors: Shih-Chung Kang, Taipei (TW); Yung-Shuen Su, Taipei (TW)

(73) Assignee: National Taiwan University, Taipei (TW)

( * ) Notice: Subject to any disclaimer, the term of this patent is extended or adjusted under 35 U.S.C. 154(b) by 570 days.

(21) Appl. No.: 12/985,095

(22) Filed: Jan. 5, 2011

(65) Prior Publication Data

US 2012/0081541 A1    Apr. 5, 2012

(30) Foreign Application Priority Data

Oct. 4, 2010   (TW) ................................ 99133775 A (51) Int. Cl.
   *H04N 7/18*      (2006.01)

(52) U.S. Cl.
   CPC .................................... *H04N 7/183* (2013.01)

(58) Field of Classification Search
   USPC ........................................................... 348/48
   See application file for complete search history.

(56) References Cited

U.S. PATENT DOCUMENTS

| 6,205,243 B1* | 3/2001 | Migdal et al. ................. 382/154 |
| 2003/0178487 A1* | 9/2003 | Rogers ........................... 235/454 |
| 2006/0013454 A1* | 1/2006 | Flewelling et al. ........... 382/128 |
| 2006/0276985 A1* | 12/2006 | Xu et al. ........................... 702/81 |
| 2008/0297360 A1* | 12/2008 | Knox et al. ................... 340/628 |
| 2010/0231692 A1* | 9/2010 | Perlman et al. ................. 348/48 |

* cited by examiner

*Primary Examiner* — Tracy Li
(74) *Attorney, Agent, or Firm* — Gottlieb, Rackman & Reisman, P.C.

(57) ABSTRACT

A surface inspecting device is provided in the present application. The surface inspecting device includes a pair of light modules respectively providing flashes to a surface from two different angles in sequence; an image sensing module acquiring an image of the surface upon a respective one of the flashes; and a computing module electrically connected with the image sensing module and processing the image by an image subtraction algorithm.

10 Claims, 7 Drawing Sheets

METHOD AND DEVICE FOR INSPECTING SURFACE

The application claims the benefit of Taiwan Patent Application No. 099133775, filed with the Intellectual Property Office of Taiwan, Republic of China, on Oct. 4, 2010, the disclosures of which are incorporated herein in their entirety by reference.

FIELD OF THE INVENTION

The present invention relates to a surface inspecting device. More particularly, the present invention relates to a surface inspecting device for inspecting roadway pavement.

BACKGROUND OF THE INVENTION

Currently, the pavement inspection for roadway can be approximately categorized into two classes including the manual investigation and the automatic investigation. The manual investigation is performed in accordance with the requirements under ASTM D6433. When the manual investigation is being practiced, it requires two engineers cooperating with each other to perform the investigation. However, for the manual investigation, the measurements to the damage grade or damage type are obtained on the basis of visual estimations, so that the results thereof might readily be subjectively biased and artificial negligence may easily occur.

The automatic investigation utilizes the instruments capable to manifest characters of terrain, such as, a supersonic sensor, a laser sensor, a camera and a video camera, to collect data relevant to the pavement in situ. The physical samples in situ will be replaced by the captured digital data. The automatic investigation provides better inspecting results than that of the manual investigation.

However, most of the current automatic investigation for pavement, in particular to the method in combination with the image identification scheme to perform the pavement inspection by utilizing the camera or the videos camera to capture digital image data, will encounter difficulties as follow.

(1) The inspecting result is interfered by the sun light. When the inspection is performed in daytime, shadows projected by such as road trees, road lamps, wire poles and buildings onto the surface of roadway, will affect the quality of images. Not only causing the difficulties for image post-processing, but the shadows will also degrade the efficiency for inspection.

(2) The inspecting result is influenced by external lights. If the roadway inspection is performed under the circumstances where the luminosity of sunlight is insufficient, the light fixture, such as road lamps, vehicle illumination instruments and other exterior lightings, are usually adopted to enhance the visibility of roadway. However, the various light sources will cause issue that luminosity in the images is non-uniform.

(3) The inspecting result is influenced by the lane markings on the roadway. The lane marking does not belong to breakings, cracks or defects on pavement of the roadway, but it perturbs the image post-processing.

(4) The inspecting result is influenced by the dirty spots on the roadway. Although the dirty spots, such as oil stained, water stained and etc., do not belong to the breakings on pavement, the spots will cause the image hardly identified and easily misjudged.

In order to overcome the drawbacks in the prior art, an electronic device having a bi-stable display is thus provided. The particular design in the present invention not only solves the problems described above, but also is easy to be implemented. Thus, the invention has the utility for the industry.

SUMMARY OF THE INVENTION

The present invention proposes a method and device for inspecting surface. A dual-light source is disposed on the left and right side of an image capturing device respectively and entire equipment is then installed on a mobile robot vehicle. The light source at one of the left and right side provides illuminations to an object under test and the image capturing device acquires a first image during illuminations and the light source at another side provides another illumination to the object under test and the image capturing device acquires a second image during illuminations. A computing module is utilized for performing an image subtraction scheme which subtracts the first image with the second image to obtain a single processed deviated image. The final deviated will be used for identify the uneven or defects on the pavement.

In accordance with the first aspect of the present invention, a surface inspecting device is provided. The surface inspecting device includes a pair of light modules respectively providing flashes to a surface from two different angles in sequence; an image sensing module acquiring an image of the surface upon a respective one of the flashes; and a computing module electrically connected with the image sensing module and processing the image by an image subtraction algorithm.

In accordance with the second aspect of the present invention, a surface inspecting device is provided. The surface inspecting device includes a plurality of lights respectively providing illuminations from different incident angles to an object in sequence; an image sensor forming an image of the object upon a respective one of the illuminations; and a computing unit electrically connected with the image sensing module and processing the image by an image subtraction scheme.

In accordance with the third aspect of the present invention, a surface inspecting method is provided. The surface inspecting method includes acquiring at least two images for an object from at least two incident angles in sequence; and processing the images by an image subtraction scheme.

Other objects, advantages and efficacy of the present invention will be described in detail below taken from the preferred embodiments with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 1:
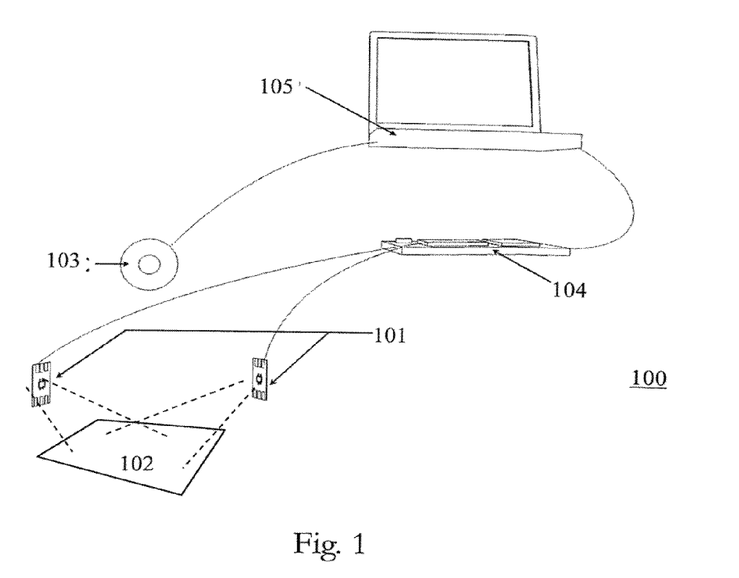
FIG. 1 is schematic diagram illustrating a first embodiment according to the present invention.

Please refer to FIG. 1, which is a schematic diagram illustrating a first embodiment according to the present invention. The surface inspecting device 100 includes a pair of light modules 101a and 101b, an object under test (OUT) 102, an image sensing module 103, a control module 104 and a computing module 105, wherein the image sensing module 103 is electrically connected with the computing module 105, the pair of light modules 101a and 101b are electrically connected with the computing module 105 through the control module 104.

The light modules 101a and 101b are preferably one selected from a group consisting of a light bulb, a light tube, a flash light, an LED, various illuminations, light fixtures and a combination thereof. The OUT 102 is preferably a flat object, e.g.: such as surface of roadway, tarred pavement, concrete road and etc. The image sensing module 103 is preferably one selected from a group consisting of a digital camera, a digital video camera, a web cam, an image sensor having a photosensitive element, e.g.: such as CCD and CMOS, various image capturing instrument and a combination thereof. The computing module 105 is preferably one selected from a group consisting of a notebook computer, a laptop computer, a personal computer, a web server, a computing host, an embedded computing system, a cloud computing system, an instrument having computing capability and a combination thereof. The control module 104 is preferably an electric control circuit, such as a control circuit having RS232 interface, through which various controlling commands dispatched from the computing module 105 can be forwarded to the pair of light modules 101a and 101b.

Each of the pair of light modules 101a and 101b in FIG. 1 emits or flashes a light toward the OUT 102 from different angles or from different directions in sequence, or, the each of the pair of light modules 101a and 101b in FIG. 1 provides a flash or a light pulse to the OUT 102 in sequence from different angles or from different directions in sequence. The image sensing module 103 captures the image of the OUT 102 upon a respective one of the flashes and obtains a pair of images. The pair of images obtained will be transmitted to the computing module 105 and the computing module 105 will perform an image subtraction algorithm to the pair of images.

Figure 2:
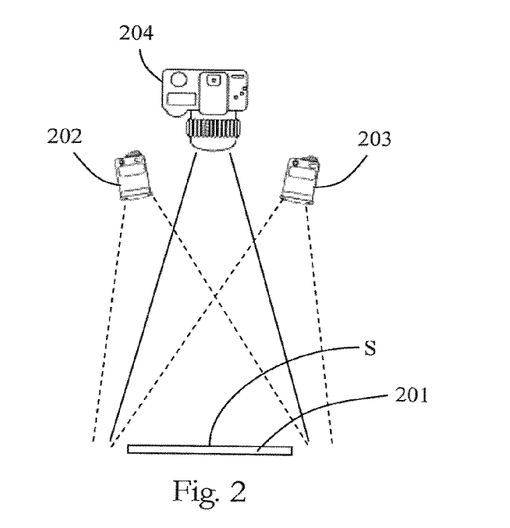
FIG. 2 is the schematic diagram illustrating a second embodiment according to the present invention.

Please refer to FIG. 2, which is a schematic diagram illustrating a second embodiment according to the present invention. In the second embodiment, in order to inspect and find out whether there are craters, cracks, breakings or uneven existing on the pavement S of roadway 201, a digital camera (DC) 204 is first adjusted to be focused on the pavement. Two LED flash lights 202 and 203 are then set up at different positions and provide flashes to the pavement S in sequence from different angles. For example, the LED flash light 102 first emits flash from the position A and the LED flash 103 then emits flash subsequently from the position B. While the respective flashes provided from the LED flash lights 202 and 203 are being lighten, the DC 204 will simultaneously capture the image for the pavement in correspondence with the respective flashes.

Figure 3:
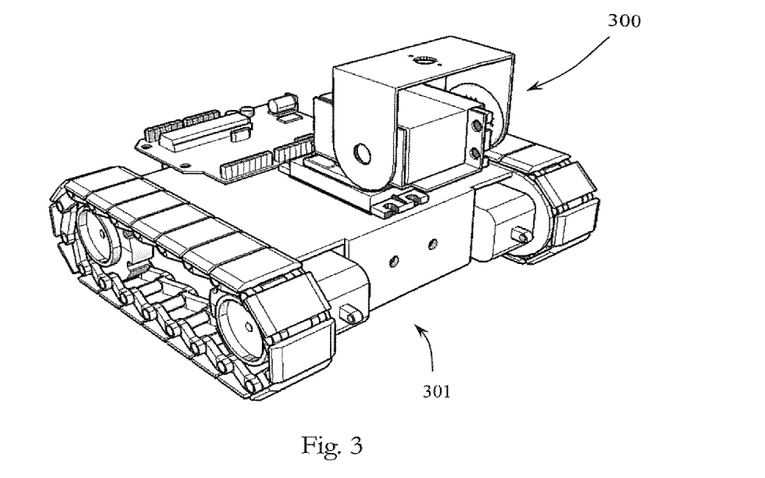
FIG. 3 is the schematic diagram illustrating a third embodiment according to the present invention.

Please resume referring to FIG. 3, which is a schematic diagram illustrating the third embodiment according to the present invention. A mobile vehicle 301 is utilized for carrying the surface inspecting device 300 according to the present invention including the light module, control module, image sensing module and computing module. By utilizing the mobile vehicle 301 to carry the surface inspecting device 300 and planning vehicle's moving trail, e.g.: such as a grid type movement and a random based movement, in advance, the surface inspecting device 300 according to the present invention can rapidly and comprehensively inspect the surface of a roadway, in particular to a tarred surface. The mobile vehicle 301 is preferably one selected from a group consisting of an engineering mobile platform, a smart inspecting vehicle, a miniature inspecting vehicle, a robot, a wheeled vehicle, a tracked vehicle and a combination thereof.

Figure 4A:
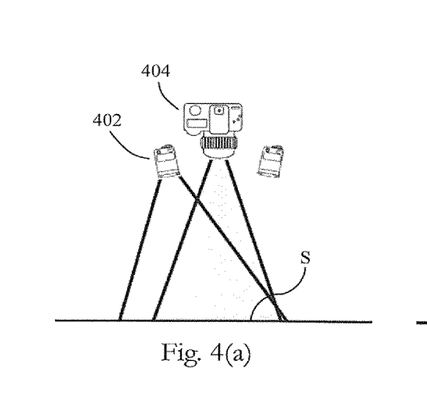
FIGS. 4(a) and 4(b) are the schematic diagrams illustrating the decomposition of movement for the surface inspecting method according to the present invention.
Figure 4B:
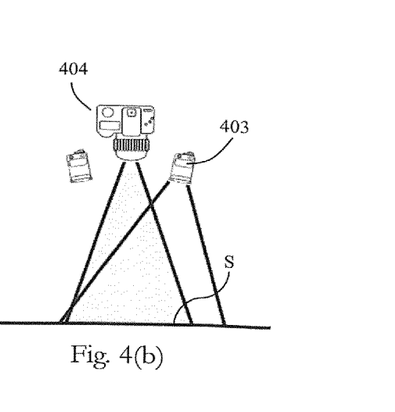

By the schematic diagrams FIG. 4(a) through FIG. 4(b) for decomposition of movement, the above-mentioned image sensing/filming processes can be further understood. In FIG. 4(a), when the first flash light 402 is activated for providing flash to the pavement S, the DC 404 is simultaneously triggered for capturing the image of the pavement S. In FIG. 4(b), when the second flash light 403 is activated for providing flash to the pavement S, the DC 404 is simultaneously triggered for capturing the image of the pavement S as well.

Figure 5A:
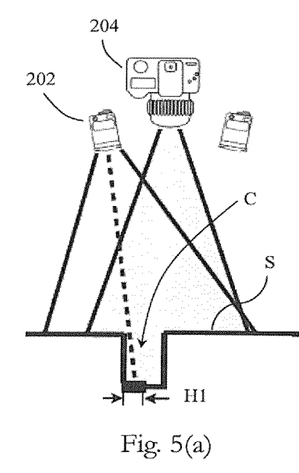
FIGS. 5(a), 5(b) and 5(c) are the schematic diagrams illustrating the principle of the image subtraction algorithm according to the present invention.
Figure 5B:
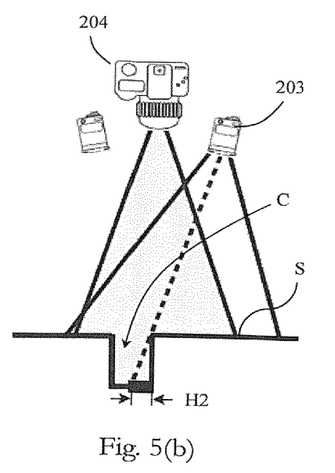
Figure 5C:
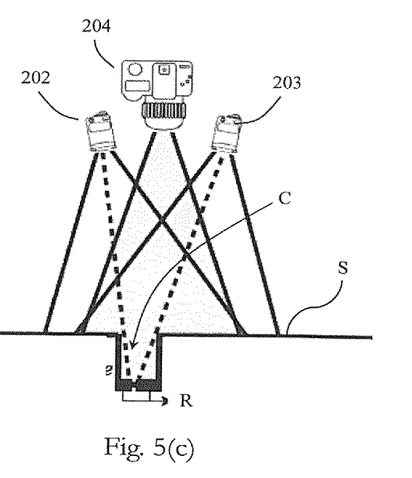

Please refer to FIGS. 5(a), 5(b) and 5(c), which is a diagram illustrating the principle of the image subtraction algorithm. There are tiny craters, cracks, breakings and defects existing on pavement S in FIGS. 5(a), 5(b) and 5(c). In FIG. 5(a), while the LED flash light module 202 is activated, DC 204 films the craters C existing on the pavement S from a first direction and generates image P1. The pixel marked as valid where the craters C correspondingly exist of the image will appear a darker shadow H1. In FIG. 5(b), while the LED flash light module 203 is activated, DC 204 films the craters C existing on the pavement S from a second direction different form the first direction and generates image P2. The pixel also marked as valid where the craters C correspondingly exist of the image will display a darker shadow H2.

A gray scale processing is then performed to the respective obtained images so as to transform the color of each of pixels in the respective images turning into a specific gray value. Subsequently, the two images P1 and P2 which already turned into gray scale are subtracted to each other pixel by pixel to obtain one single processed image PD from the two images P1 and P2 as demonstrated in FIG. 5(c). For the pixels on the processed image PD corresponding to the positions on the respective images P1 and P2 having none of shadows H1 and H2 caused by the craters C, they certainly have a zero value and are regarded as a zero-value pixel on image PD, after the two gray-scale images P1 and P2 are subtracted to each other pixel by pixel since the two images P1 and P2 present the identical gray value at each pixels corresponding to the positions without shadows. But for the pixels on the processed image PD corresponding to the positions on the respective images P1 and P2 having shadows H1 and H2 caused by the craters C, they certainly have a non-zero deviated value R and are regarded as a nonzero-value pixel on image PD since the two images P1 and P2 display different gray values at each pixels corresponding to the positions with shadows. Accordingly, in accordance with the arrangement of the deviated value R, the pattern and the distributing scope for the defects, including any craters, cracks, fractals, uneven and breakings, existing on the pavement can be easily found out.

Figure 6A:
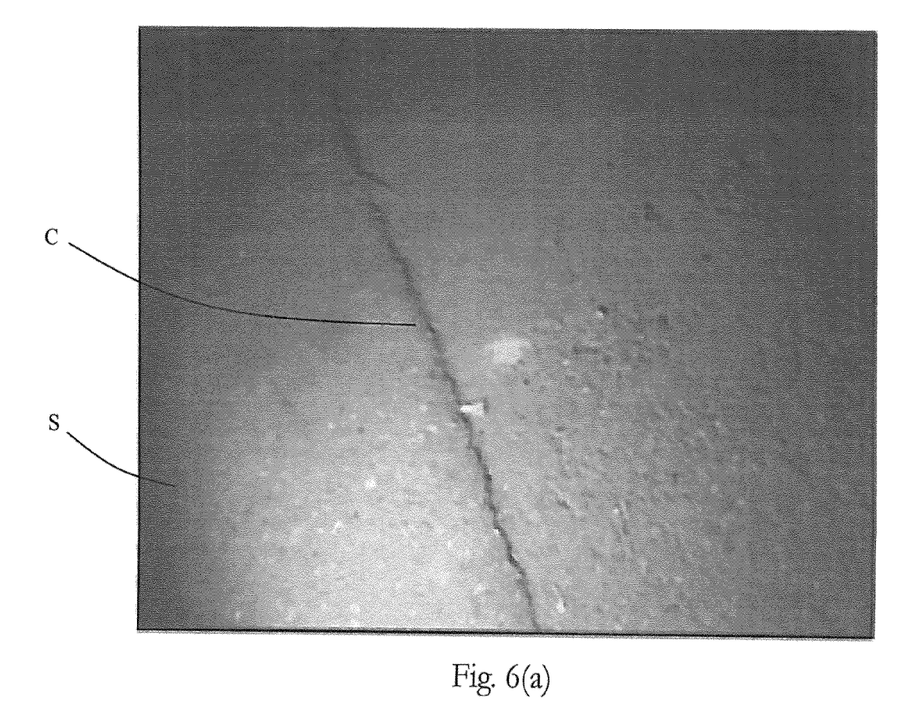
FIGS. 6(a), 6(b) and 6(c) are the diagrams illustrating the images P1, P2 and PD according to the present invention.
Figure 6B:
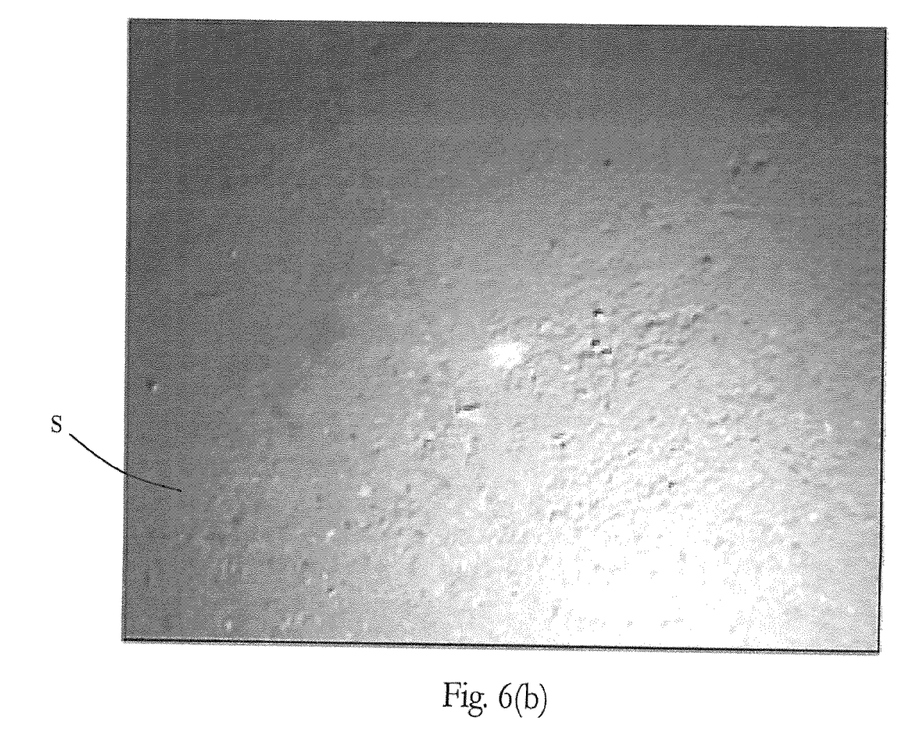
Figure 6C:
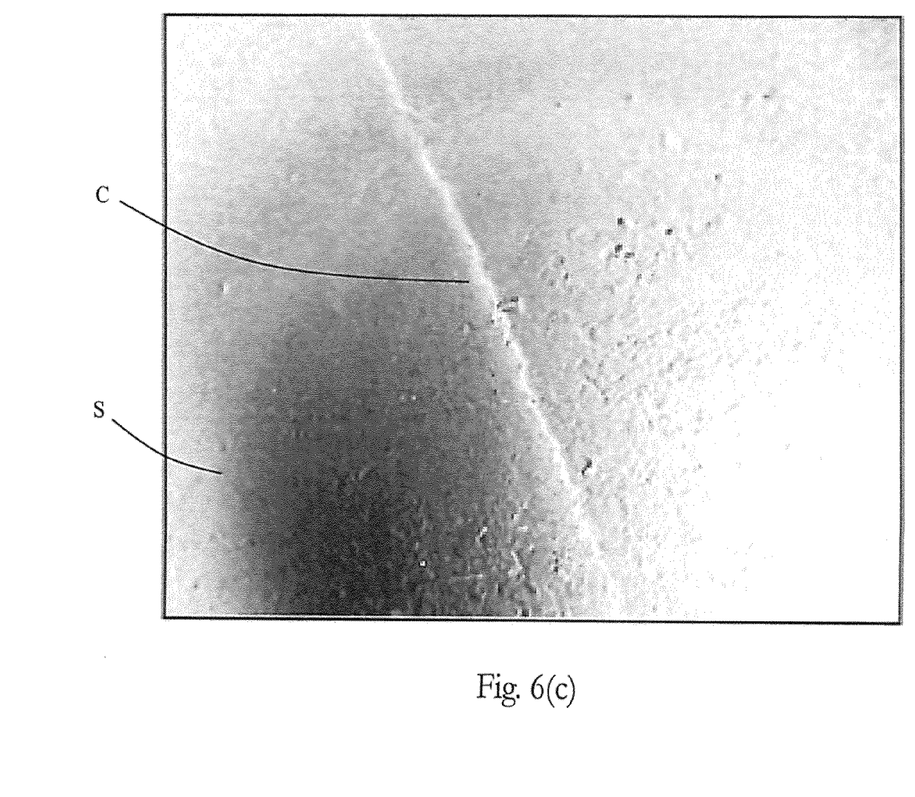

Please refer to FIGS. 6(a), 6(b) and 6(c), which disclose images P1, P2 and PD respectively. Images P1 and P2 are two photos having craters C apparently existing on the pavement S. For the image P1 in FIG. 6(a), the light beam is projected onto the pavement S from left side. Since the shadows generated by the craters C occur behind the craters C on the image P1, the existence of craters C can be easily identified. For the image P2 in FIG. 6(b), the light beam is projected onto the pavement S from right side. Due to the projecting angle, there is none of shadows relevant to the craters C occurring on the image P2. Therefore, one can not identify the existence of craters C from image P2. FIG. 6(c) display a deviated image PD obtained from the result of image subtraction performed with the images P1 and P2. The black part on the deviated image PD presents a zero-value pixel which belongs to an even and good portion for the pavement S. On contrary, the other part which does not show black presents a nonzero-value pixel which belongs to an uneven and defected portion for the pavement S. From FIG. 6(c), the position the crater C locates can be simply identified by recognizing the non-zero deviated values R on image PD.

Figure 7:
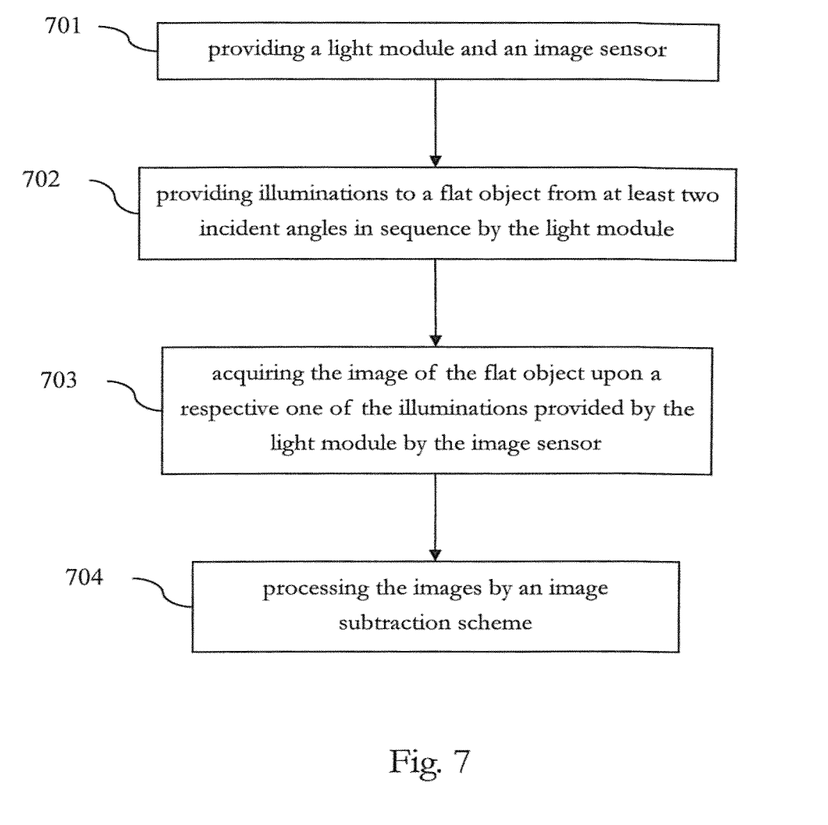
FIG. 7 is a flow chart illustrating the surface inspecting method according to the present invention.

To briefly sum up, a surface inspecting method can be accordingly categorized. Please direct to FIG. 7, which disclose a flow chart illustrating the surface inspecting method according to the present invention. The surface inspecting method including steps of: step 701, providing a light module containing dual lights and an image sensor; step 702, providing illuminations to a flat object from at least two incident angles in sequence by the light module; step 703, acquiring the image of the flat object upon a respective one of the illuminations provided by the light module by the image sensor; and step 704, processing the images by an image subtraction scheme so as to identify the uneven existing on the surface of the flat object.

Hence, the present surface inspecting device includes at least various advantages as follows.

(1) The present invention can overcome the issue regarding the non-uniformity of luminosity and the stained pavement in the field and improve the identifiability for the image data.

(2) The present invention can be integrated into the existing system since it provides image data comparable with the existing algorithm, such that the present invention is much feasible to enter into the current industry in the field.

(3) The present invention can effectively decrease the influences caused by the sunlight to the inspecting results during the inspection for roadway. When the inspection is performed in daytime, shadows projected by such as road trees, road lamps, wire poles and buildings onto the surface of roadway, will affect the quality of images. Not only causing the difficulties for image post-processing, but the shadows will also degrade the efficiency for inspection. The present invention effectively overcomes the influence caused by shadows.

(4) The present can effectively reduce the influences caused by external lights to the inspecting results during the inspection for roadway. If the roadway inspection is performed under the circumstances where the luminosity of sunlight is insufficient, the light fixture, such as road lamps, vehicle illumination instruments and other exterior lightings, are usually adopted to enhance the visibility of roadway. However, the various light sources will cause issue that luminosity in the images is non-uniform. The present invention can overcome the issue regarding the non-uniform luminosity of the image.

(5) The present invention can reduce the influences caused by the lane markings on the roadway to the inspecting results during the inspection. The lane marking does not belong to breakings, cracks or defects on pavement of the roadway, but it perturbs the image post-processing. The present invention can effectively eliminate the influence caused by the lane markings to the images.

(6) The present invention can reduce the influence caused by the dirty spots on the roadway to the inspecting result during the inspection. Although the dirty spots, such as oil stained, water stained and etc., do not belong to the breakings on pavement, the spots will cause the image hardly identified and easily misjudged. The present invention can effectively remove the influence caused by the dirty spots to the images.

(7) The present invention can provide the image data with high identifiablity.

(8) The present invention can significantly reduce the cost demanded for inspection.

Further Embodiments are provided as follows.

Embodiment 1 a surface inspecting device, including a pair of light modules respectively providing flashes to a surface from two different angles in sequence; an image sensing module acquiring an image of the surface upon a respective one of the flashes; and a computing module electrically connected with the image sensing module and processing the image by an image subtraction algorithm.

Embodiment 2 the device according to embodiment 1 further including a control module switching on and off the pair of light modules and the image sensing module.

Embodiment 3 the device according to embodiment 2 further including a mobile vehicle carrying the pair of light modules, the control module, the image sensing module and the computing module.

Embodiment 4 the device according to embodiment 3, wherein the mobile vehicle is one selected from a group consisting of an engineering mobile platform, a smart inspecting vehicle, a miniature inspecting vehicle, a robot, a wheeled vehicle, a tracked vehicle and a combination thereof.

Embodiment 5 the device according to embodiment 1, wherein the pair of light modules are one selected from a group consisting of a light bulb, a light tube, a flash light, an LED and a combination thereof.

Embodiment 6 the device according to embodiment 1, wherein the image sensing module is one selected from a group consisting of a digital camera, a digital video camera, a web cam, an image sensor having a photosensitive element and a combination thereof.

Embodiment 7 the device according to embodiment 1, wherein the computing module is one selected from a group consisting of a notebook computer, a laptop computer, a personal computer, a web server, a computing host, an embedded computing system, a cloud computing system and a combination thereof.

Embodiment 8 a surface inspecting device, including a plurality of lights respectively providing illuminations from different incident angles to an object in sequence; an image sensor forming an image of the object upon a respective one of the illuminations;

and a computing unit electrically connected with the image sensing module and processing the image by an image subtraction scheme.

Embodiment 9 a surface inspecting method, including acquiring at least two images for an object from at least two incident angles in sequence; and processing the images by an image subtraction scheme.

Embodiment 10 the method according to embodiment 9, wherein the step of processing the images by an image subtraction scheme further includes steps of subtracting one out of the at least two images from the other; and obtaining a single image from the two subtracted images.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A pavement surface inspecting device used in a civil engineering field for inspecting a road surface, comprising:
   a pair of light modules being sequentially activated and providing flash lights incident to a pavement surface from two different incident angles, to cause an unevenness distributed with an irregular region on the pavement surface to be exposed on the pavement surface in a form of a light shadow, in which the incident angles are independent of the unevenness;
   an image sensing module being activated to acquire images of the pavement surface while one of the light modules are activated, which images contain the light shadow for the unevenness shown on the pavement surface; and
   a computing module electrically connected with the image sensing module, receiving the acquired images, transforming the respective acquired images into a digital grayscale image consisting of a plurality of grayscale pixels, each of which grayscale pixels have a grayscale value, subtracting pixel by pixel one of the transformed digital grayscale images from the other to generate a single processed image consisting of a plurality of processed pixels, each of which processed pixels have a discrepant value and among which processed pixels the multiple pixels have the discrepant value greater than a threshold are identified as uneven pixels, and determining the irregular region on the pavement surface to which the uneven pixels are corresponding as an uneven region on the pavement surface.

2. The device according to claim 1 further comprising a control module switching on and off the pair of light modules and the image sensing module.

3. The device according to claim 2 further comprising a mobile vehicle carrying and moving the pair of light modules, the control module, the image sensing module and the computing module.

4. The device according to claim 3, wherein the mobile vehicle is one selected from a group consisting of an engineering mobile platform, a smart inspecting vehicle, a miniature inspecting vehicle, a robot, a wheeled vehicle, a tracked vehicle and a combination thereof.

5. The device according to claim 1, wherein the pair of light modules are one selected from a group consisting of a light bulb, a light tube, a flash light, an LED and a combination thereof.

6. The device according to claim 1, wherein the image sensing module is one selected from a group consisting of a digital camera, a digital video camera, a web cam, an image sensor having a photosensitive element and a combination thereof.

7. The device according to claim 1, wherein the computing module is one selected from a group consisting of a notebook computer, a laptop computer, a personal computer, a web server, a computing host, an embedded computing system, a cloud computing system and a combination thereof.

8. A pavement surface inspecting device used in a civil engineering field for inspecting a road surface, comprising:
   a plurality of lights being activated sequentially and providing multiple illuminations from different incident angles incident to a pavement surface to cause an unevenness distributed with an irregular region on the pavement surface to be exposed on the pavement surface in a form of a light shadow, in which the incident angles are unassociated with the unevenness;
   an image sensor being activated to form images of the pavement surface while a respective one of the multiple illuminations are activated, which images contain the light shadow for the unevenness shown on the pavement surface; and
   a computing unit electrically connected with the image sensor, receiving the acquired images, transforming the formed images into a respective digital grayscale image consisting of a plurality of grayscale pixels, each of which pixels have a grayscale value, and subtracting pixel by pixel one out of the transformed digital grayscale images from the other to generate a single processed image consisting of a plurality of processed pixels, each of which processed pixels have a discrepant value and among which processed pixels the multiple pixels have the discrepant value greater than a threshold are identified as uneven pixels, and determining the irregular region on the pavement surface to which the uneven pixels are corresponding as an uneven region on the pavement surface.

9. A pavement surface inspecting method used in a civil engineering field for inspecting a road surface, comprising:
   acquiring at least two images for a pavement surface lightened by flash lights incident from different incident angles in sequence to cause an unevenness distributed with an irregular region on the pavement surface to be exposed on the pavement surface in a form of a light shadow, which at least two images contain the light shadow for the unevenness shown on the pavement surface, in which the incident angles are unassociated with the unevenness;
   transforming the acquired at least two images into a respective digital grayscale image consisting of a plurality of grayscale pixels, each of which grayscale pixels have a grayscale value; and
   subtracting pixel by pixel one out of the at least two transformed digital grayscale images from the other to generate a single processed image consisting of a plurality of processed pixels, each of which processed pixels have a discrepant value and among which processed pixels the multiple pixels have the discrepant value greater than a threshold are identified as uneven pixels; and determining the irregular region on the pavement surface to which the uneven pixels are corresponding as an uneven region on the pavement surface.

10. The method according to claim 9, wherein the acquiring step is performed by using a image sensor, and the transforming, subtracting and determining steps are performed by using a digital computing module.

\* \* \* \* \*